United States Patent [19]

Lea et al.

[11] Patent Number: 4,661,947
[45] Date of Patent: Apr. 28, 1987

[54] SELF-ROUTING PACKET SWITCHING NETWORK WITH INTRASTAGE PACKET COMMUNICATION

[75] Inventors: Chin-Tau A. Lea, Lisle; Warren A. Montgomery, DeKalb, both of Ill.

[73] Assignee: American Telephone and Telegraph Company AT&T Bell Laboratories, Murray Hill, N.J.

[21] Appl. No.: 654,763

[22] Filed: Sep. 26, 1984

[51] Int. Cl.$^4$ .............................................. H04J 6/00
[52] U.S. Cl. ........................................ 370/60; 370/94
[58] Field of Search ..................... 370/60, 94, 58, 16, 370/54

[56] References Cited

U.S. PATENT DOCUMENTS

| | | | |
|---|---|---|---|
| 4,201,891 | 5/1980 | Lawrence et al. | 370/58 |
| 4,484,326 | 11/1984 | Turner | 370/60 |
| 4,494,230 | 1/1985 | Turner | 370/60 |
| 4,512,011 | 4/1985 | Turner et al. | 370/60 |
| 4,550,397 | 10/1985 | Turner et al. | 370/60 |
| 4,556,972 | 12/1985 | Chan et al. | 370/60 |

FOREIGN PATENT DOCUMENTS 58-150349  9/1983  Japan .

OTHER PUBLICATIONS

*IEEE Transactions on Computers,* vol. C-31, No. 5, May, 1982, New York (US) G. B. Adams, III, et al., "The Extra Stage Cube: A Fault-Tolerant Interconnection Network for Supersystems", pp. 443–454.
*IEEE Transactions on Computers,* vol. C-27, No. 10, Oct., 1979, New York (US) A. Hopper, et al., "Binary Routing Networks", pp. 669–703.
P. C. Richards, "Technological Evolution-The Making of a Survivable Switching System", *3rd World Telecommunication Forum,* 1979, pp. 1.2.6.1–1.2.6.8.
*IEEE Transactions on Computers,* vol. C-28, No. 10, Oct., 1979, New York (US) A. Hopper et al., "Binary Routing Networks", pp. 669–703.
*International Switching Symposium,* Montreal, Sep. 21-25, 1981, IEEE (New York, US) G. R. D. Alles et al., "An Experimental Digital Switch for Data and Voice", Session 21B, paper 3, pp. 1–7.
*International Switching Symposium,* Montreal, Sep. 21-25, 1981, IEEE (New York, US) N. Corsi, et al., "Design and Performance of Subscriber Access Equipment for Packet Switched Networks", Session 32C, paper 4, pp. 1–7.
*IEEE Transactions on Computers,* vol. C-31, No. 5, May, 1982, New York (US) G. B. Adams, III, et al., "The Extra Stage Cube: A Fault-Tolerant Interconnection Network for Supersystems", pp. 443–454.
*Proc. of the Sixth International Conf. on Computer Communication",* London, Sep. 7–10, 1982, North-Holland Pub. Co. (Amsterdam, NL) M. Romagnoli, et al., "ISDN Capabilities in a Digital Local Exchange", pp. 37–42.

Primary Examiner—Douglas W. Olms
Assistant Examiner—Kenneth I. Rokoff
Attorney, Agent, or Firm—John C. Moran

[57] ABSTRACT

A communication method and packet switching network in which self-routing packets are communicated through the network by intra-communication of the packets within stages of the network as well as inter-communication of the packets among stages. The stages each having a plurality of pairs of switch nodes with each pair having an intra-node link between the pair of nodes. Each of the switch nodes comprises input controllers and output controllers. The input controller of a node is responsive to the receipt of a packet for interrogating the address field of the packet to determine the destination of the packet. The input control on the basis of the destination determination commmunicates the packet towards the destination via either an inter-stage link or an intra-node link on the basis of availability of the links and an internal control circuit. If a packet is transmitted via an intra-node link to the paired node the latter then transmits the packet via its output controller to the next stage via an inter-stage link. If both the intra-node link and the inter-stage link are available, the internal control circuit then determines which link should be utilized in communicating the packet. The internal destination circuit performs this designating function on the basis of a random number generator.

28 Claims, 11 Drawing Figures

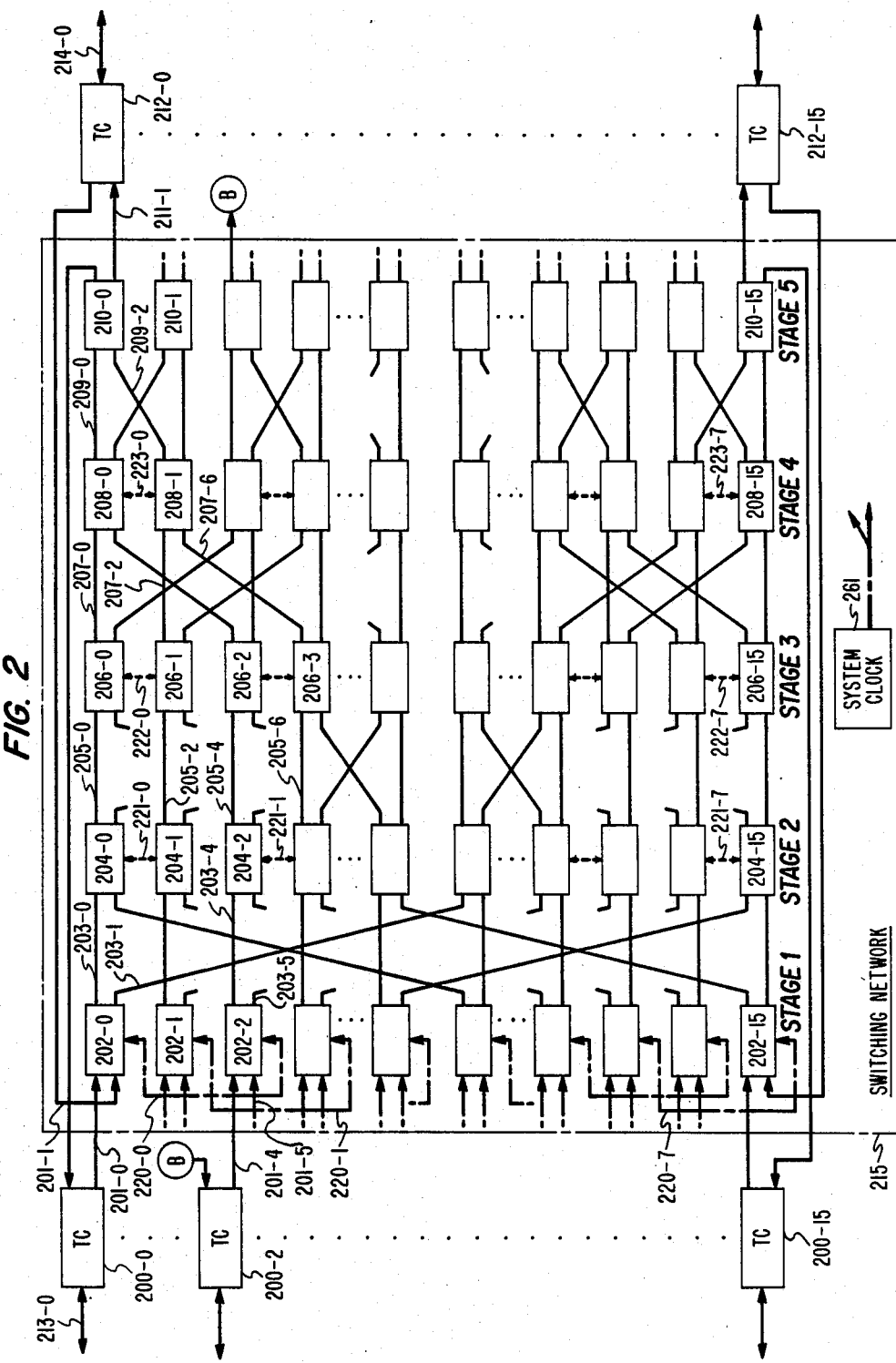

START BIT | PACKET LENGTH | DEST TRUNK CNTRLR {00001} | SOURCE TRUNK CNTRLR {00000} | CONTROL | ARRIVAL TIME | PACKET IDENTIFIER {0} | LOGICAL ADDRESS | TIME STAMP | DATA | CRC

FIG. 4

START BIT | PACKET LENGTH | DEST TRUNK CNTRLR {00010} | SOURCE TRUNK CNTRLR {00000} | CONTROL | ARRIVAL TIME | PACKET IDENTIFIER {0} | LOGICAL ADDRESS | TIME STAMP | DATA | CRC

FIG. 5

START BIT | PACKET LENGTH | DEST TRUNK CNTRLR {00100} | SOURCE TRUNK CNTRLR {00000} | CONTROL | ARRIVAL TIME | PACKET IDENTIFIER {0} | LOGICAL ADDRESS | TIME STAMP | DATA | CRC

FIG. 6

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| ⌐ | | 01000 | 00000 | | | 0 | | | | |

FIG. 7

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| ⌐ | | 10000 | 00000 | | | 0 | | | | |

SELF-ROUTING PACKET SWITCHING NETWORK WITH INTRASTAGE PACKET COMMUNICATION

CROSS-REFERENCE TO RELATED APPLICATIONS

Concurrently filed herewith and assigned to the same assignee as this application are:
C. A. Lea Case 1, "Multiple Paths In A Self-Routing Packet And Circuit Switching Network" Ser. No. 654,765; and
C. A. Lea Case 3, "An Alternate Self-Routing Packet Switching Node Having Fault Detection Capabilities," Ser. No. 654,764.

TECHNICAL FIELD

This invention relates to a method and packet switching architecture for the packet switching of voice and data signals. The invention specifically pertains to a packet switching architecture having switching stages in which self-routing packets can be intra-communicated within the stage as well as inter-communicated with other stages.

BACKGROUND OF THE INVENTION

Self-routing packet switching networks such as those using banyan switching nodes communicate packets on the basis of address information contained within the packets. One such switching network is disclosed in the application of J. S. Turner, Case 8, Ser. No. 393,112, which was filed on June 25, 1982, and allowed on July 23, 1984, now U.S. Pat. No. 4,512,011, and assigned to same assignee as this application, and is illustrated in FIG. 1. In the latter figure, there is only one unique route between each input and output pair of the network. For example, there is only one path between trunk controller 100-0 and trunk controller 112-0. This path is via nodes 102-0, 104-0, 106-0, 108-0, 110-0 and links 101-0, 103-0, 105-0, 107-0, 109-0, and 111-1. Node 102-0 is responsive to address information within the packet to route the packet to node 104-0, and subsequent nodes in the previously described path are responsive to the address information to properly route the packet until it is received by trunk controller 112-0. In addition, trunk controller 100-0 shares a portion of this path to trunk controller 112-0 with trunk controller 100-2 since trunk controller 100-2 only has one path to trunk controller 112-0, and this path is via nodes 102-2, 104-2, 106-2, 108-0, and 110-0. These two paths initially meet at node 108-0 which can have a maximum of 16 trunk controllers attempting to transmit information to one of four trunk controllers attached to nodes 110-0 or 110-1. When such an unbalanced traffic condition occurs, the traffic capacity is limited to the maximum traffic capacity of node 108-0. It is important to realize that the traffic concentration can be even higher on node 106-0 than previously described. In addition, to the problems of unbalanced traffic, if node 108-0 fails, then a large number of trunk controllers cannot communicate with certain other trunk controllers.

One known method for alleviating the reliability and traffic problems in a self-routing network is discussed in the report entitled, "Development of a Voice Funnel System", Bolt, Beranek and Newman, Inc., Report No. 4098, August, 1979, pages III-29 through III-76, which discloses the use of an extra stage of banyan switching nodes at the input of a self-routing network in an attempt to resolve the previously mentioned problems. The report proposes that this extra stage of switching be identical to other stages of the network and be utilized by adding an extra bit of addressing to the address field of each packet being routed through the switching network. This extra stage of switching would precede stage 1 of the shown in FIG. 1. The extra address bit would be controlled by hardware or software external to the switching network and would determine the route through the switching network. The hardware or software would use this bit so as to avoid a node which was failing or experiencing heavy traffic.

SUMMARY OF THE INVENTION

The aforementioned problems are solved and a technical advance is achieved in accordance with the principles of this invention. A departure in the art is an innovative architecture and method that allow switching nodes within a stage to directly interexchange packets so as to bypass switching nodes in subsequent stages that are experiencing unbalanced traffic or failing.

Advantageously, each switching node in a stage upon receipt of a packet interrogates an address within the packet to determine a set of output links from the stage which can communicate the packet to its destination. One of the links of the determined set is designated by an internal selection circuit within the receiving node. If the designated link is idle, the receiving node transmits the packet via that link. If the designated link is not idle, the receiving node transmits the packet on any free link in the set.

Advantageously, not all of the links within the set are directly connected to the receiving node, and the receiving node must communicate received packets to other nodes in the stage to which the remainder of the links in the set are connected. This communication is performed by the receiving node first exchanging signals with the other nodes to ascertain that a desired link is idle before transmitting the packet. In addition, the selection circuit is a random number generator which controls the selection of the designated link so that the packets are randomly distributed over the available routes.

The illustrated method functions with a switching network having a plurality of stages each having a plurality of switch nodes. Individual sets of switch nodes within a given stage are interconnected by intranode links and nodes in two different stages are interconnected by inter-node links. A path from one stage to the next stage can be established via one node within the first stage and an inter-node link to the second stage or via a first node in the first stage, an intra-link, a second node in the first stage, and an inter-node link to the second stage. The method includes the steps of selecting a subset of intra-node and inter-node links by one of the switching nodes in response to routing information of a given packet, generating signals designating one of the subset of the intra-node and inter-node links for communication of the packet, and routing the packet to the second stage.

Advantageously, the method further comprises the steps of sending a packet communication request to the node in said second stage and supplying a packet communication availability signal from the node in the second stage to the requesting node upon the node in the second stage having capacity to accept the packet. If the node in the second stage cannot accept a packet, the method further provides for the steps of transmitting a packet communication unavailability signal to the node in the first stage and routing the packet via another connection from the subset of intra-node and inter-node links.

These and other advantages and features of the present invention will become apparent from the following description of an illustrative embodiment of the invention taken together with the drawing.

BRIEF DESCRIPTION OF THE DRAWING

FIG. 2 illustrates, in block diagram form, a packet switching network which is the subject matter of this invention;

FIGS. 3 through 7 illustrate the configurations of a packet during transmission through the switching network of FIG. 2;

DETAILED DESCRIPTION

Figure 1:
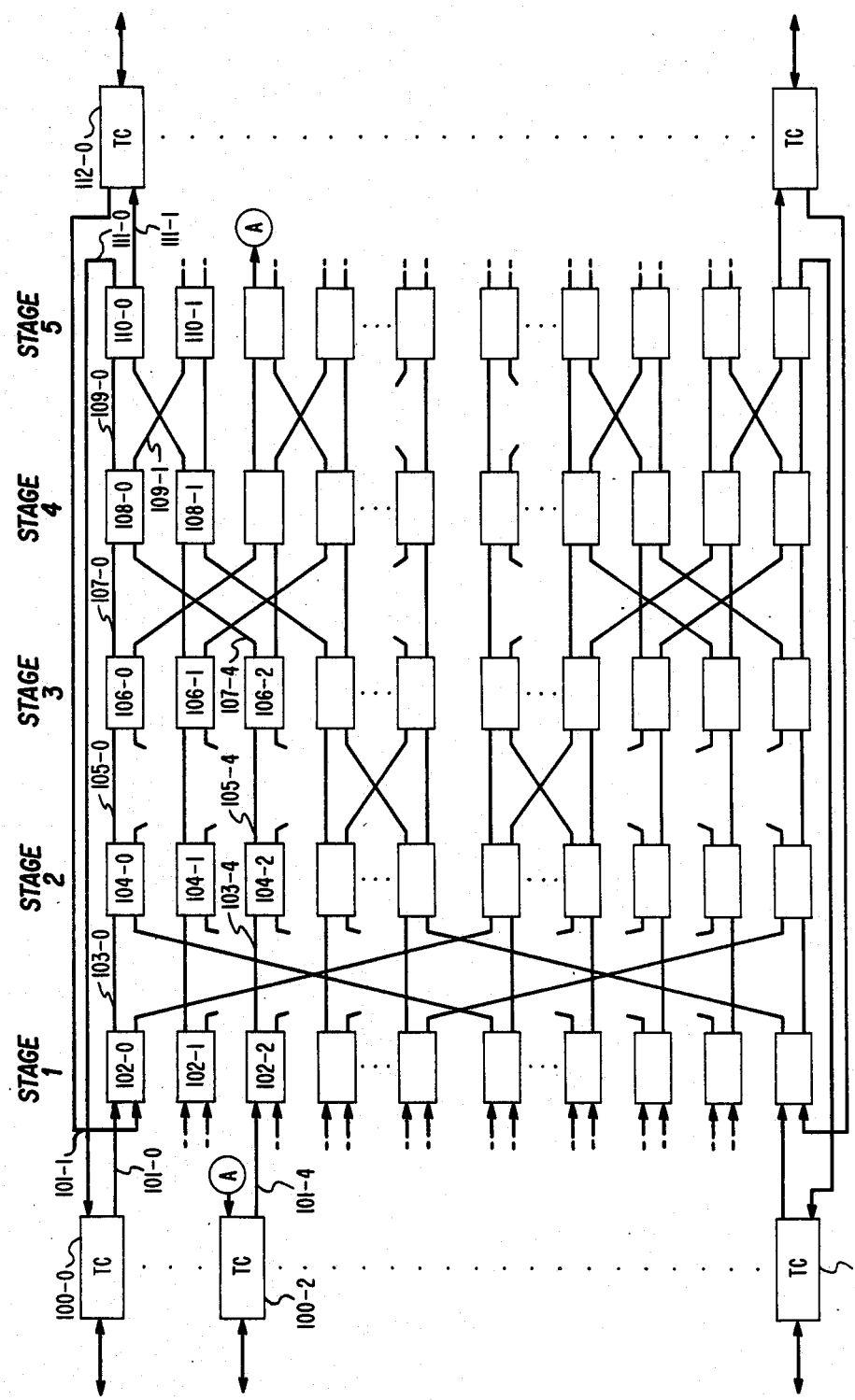
FIG. 1 illustrates, in block diagram form, a prior art packet switching network.

FIG. 2 shows an illustrative packet switching network 215 which is the focus of this invention. Switching network 215 terminates a plurality of trunk controllers and communicates packets received on any one of these trunk controllers to another trunk controller. The trunk controllers receive and transmit packets on their attached trunks. Each trunk packet transmitted on a trunk contains a logical address which specifies the destination trunk controller to which the packet switching network 215 is to communicate the received packet. Each trunk controller comprises a memory containing a translation table for converting the logical address into a switch address that is used by network 215 to route the packets to the destination trunk controller. The transformation of a trunk packet to a switch packet by a trunk controller is discussed in detail in the previously mentioned J. S. Turner, Case 8, and is not repeated here.

A typical switch packet is illustrated in FIG. 3. Network 215 is responsive to the destination trunk controller field of the switch packet to communicate the switch packet to the destination trunk controller via one of a multitude of routes within network 215. This communicating is done in response to the address information and the availability of routes within network 215. As the switch packet is communicated through network 215, each switch node which receives the switch packet selects one of two output links that are designated by destination trunk controller field for communication of the switch packet to the next stage. Thus, providing a plurality of paths through network 215.

For example, consider the communication of the switch packet illustrated in FIG. 3 through network 215 from trunk controller 200-0 to trunk controller 212-0. Trunk controller 200-0 transmits the switch packet to node 202-0 via link 201-0. Node 202-0 is responsive to the packet to interrogate the most significant bit of the destination trunk controller field; and since the most significant bit of the destination trunk controller field is a "0", links 203-0 and 203-4 are designated for possible communication of the packet. On the basis of a selection made by an internal random number generator, node 202-0 attempts to transmit the packet via link 203-0 to node 204-0. If the selected link is busy, then node 202-0 attempts to transmit the packet to node 204-2 via cable 220-0, node 202-2, and link 203-4 which is the unselected link. Before transmission of the packet, node 202-2 rotates the destination trunk controller field as illustrated in FIG. 4.

If the packet is transmitted to node 204-0, the latter is responsive to the most significant address bit of the destination control field which is a "0" to select either link 205-0 or 205-2 on the basis of path availability and the state of its own internal random generator. If the packet was transmitted to node 204-2 via link 203-4, node 204-2 selects either link 205-4 or 205-6 to the third stage, which is comprised of nodes 206-0 through 206-15. The packet is received by one of the nodes 206-0 through 206-3.

The packet received by the third stage is illustrated in FIG. 5. Since the most significant address bit is a "0", the receiving node attempts to route the packet out on one of the available even numbered links available to that particular node. For example, node 206-0 attempts to route the packet via link 207-0 or 207-2, and node 206-2 attempts to route the packet via node 207-4 or 207-6. Before the receiving node in stage 3 routes the packet to a receiving node in stage 4 (either node 208-0 or 208-1), the trunk controller destination field is rotated as illustrated in FIG. 6.

The receiving node in the fourth stage, either node 208-0 or 208-1, is responsive to the most significant address bit of the destination trunk controller field being a "0" to transmit the packet illustrated in FIG. 7 to node 210-0 via either link 209-0 or 209-2. Node 210-0 is responsive to the destination field illustrated in FIG. 7 to route the packet to trunk controller 212-0 via link 211-1. The previous example illustrates that there are a multiple number of paths between trunk controller 200-0 and trunk controller 212-0, and this fact is true of communication from any of the trunks 200-0 through 200-15 to any of the trunks 212-0 through 212-15.

The method used for pairing the switching nodes together as illustrated in FIG. 2 is defined as follows. Let $$[P_{m-1} \ldots P_2 P_1]_i^n$$

(where m equals the number of stages in the network, n equals the node number, and i equals the stage number) be the binary representation of node n's position within stage "i". Each "P" represents one binary bit. Also, let $$[P_{m-1} \ldots P_2 P_1 P_0]_i^1$$

be the binary representation of link "1" to the node in stage "i". The binary representation of the partner of a node $$[P_{m-1} \ldots P_i P_1]_i^n$$

is $$P_{m-1} \ldots \overline{P}_{(\frac{m}{2}-i+1)} \ldots P_1]_i^n$$

where $i \leq m/2$ and is $$[P_{m-1} \ldots P_i \ldots P_1]_i^n$$

where $i > m/2$. For example, switching node 202-0 in stage 1 is represented by $$[00000]_1{}^4$$

and its partner is $$[000\overline{00}]_1{}^4$$

which is $$[00010]_1{}^4$$

Another method for pairing the switching nodes together is defined as follows. Let the node n's position and the link number be defined as previously described. The binary representation of the partner of a node $$|P_{m-1}\ldots P_iP_1|_i{}^n$$

is $$[P_{m-1}\ldots \overline{P_i}\ldots P_1]_i{}^n$$

where $i \leq = m/2$ and is $$|P_{m-1}\ldots P_i\ldots \overline{P_1}|_i{}^n$$

where $i > m/2$.

Figure 8:
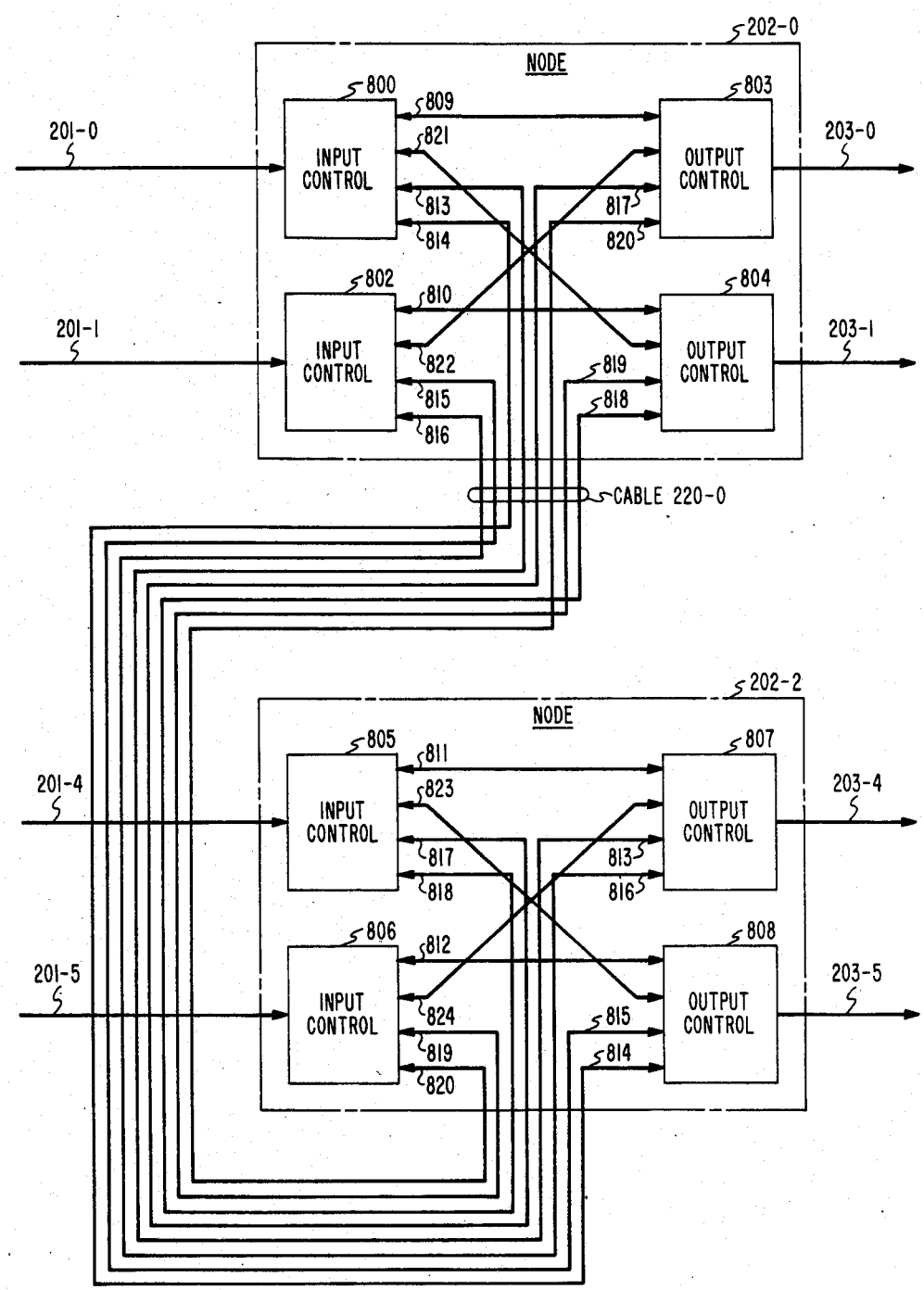
FIG. 8 illustrates, in block diagram form, a switch node of the switching network of FIG. 2.

The pair of nodes 202-0 and 202-2 are illustrated in greater detail in FIG. 8. Each node consists of two input control circuits such as 800 and two output control circuits such as 803. The input controls communicate with the output control circuits via subcables 809-824 with each subcable containing three conductors for communications of a communication request, communication grant and data signals. The communication grant signal is also referred to as a communication availability signal. Signals are communicated between the two switching nodes via cable 220-0 which comprises subcables 813-820. Input control 800 transmits request signals via the subcables to the output controls based on the interrogated address bit of the destination trunk controller field within a received switch packet.

The operation of nodes 202-0 and 202-2 will now be further explained by using the previous example of transfer of a packet from trunk controller 200-0 to trunk controller 212-0. Since the most significant bit of the destination trunk controller field in FIG. 3 is a "0", input control 800 must transmit the packet to the second stage via either link 203-0 or 203-4. The link initially selected is determined by the state of an internal random number generator. If the output of the internal random number generator is a "0" input control 800 attempts to utilize 203-0, but if the state of the internal random number generator is a "1" input control 800 attempts to utilize link 203-4. Assuming that the state of the internal random number generator is a "0", control 800 transmits via subcable 809 a request signal to output control circuit 803. If this output control circuit is idle, it transmits back to input control 800 via subcable 809 a grant signal. If output control 803 is busy, input control 800 transmits via subcable 813 a request signal to output control circuit 807. If output control circuit 807 is idle, it transmits back to input control 800 a grant signal via subcable 813; and input control 800 commences transmission in response to the grant signal. If both output control 803 and 807 are busy, input control 800 alternately transmits request signals via the appropriate subcables until a grant signal is received back from one of the output control circuits.

Figure 9:
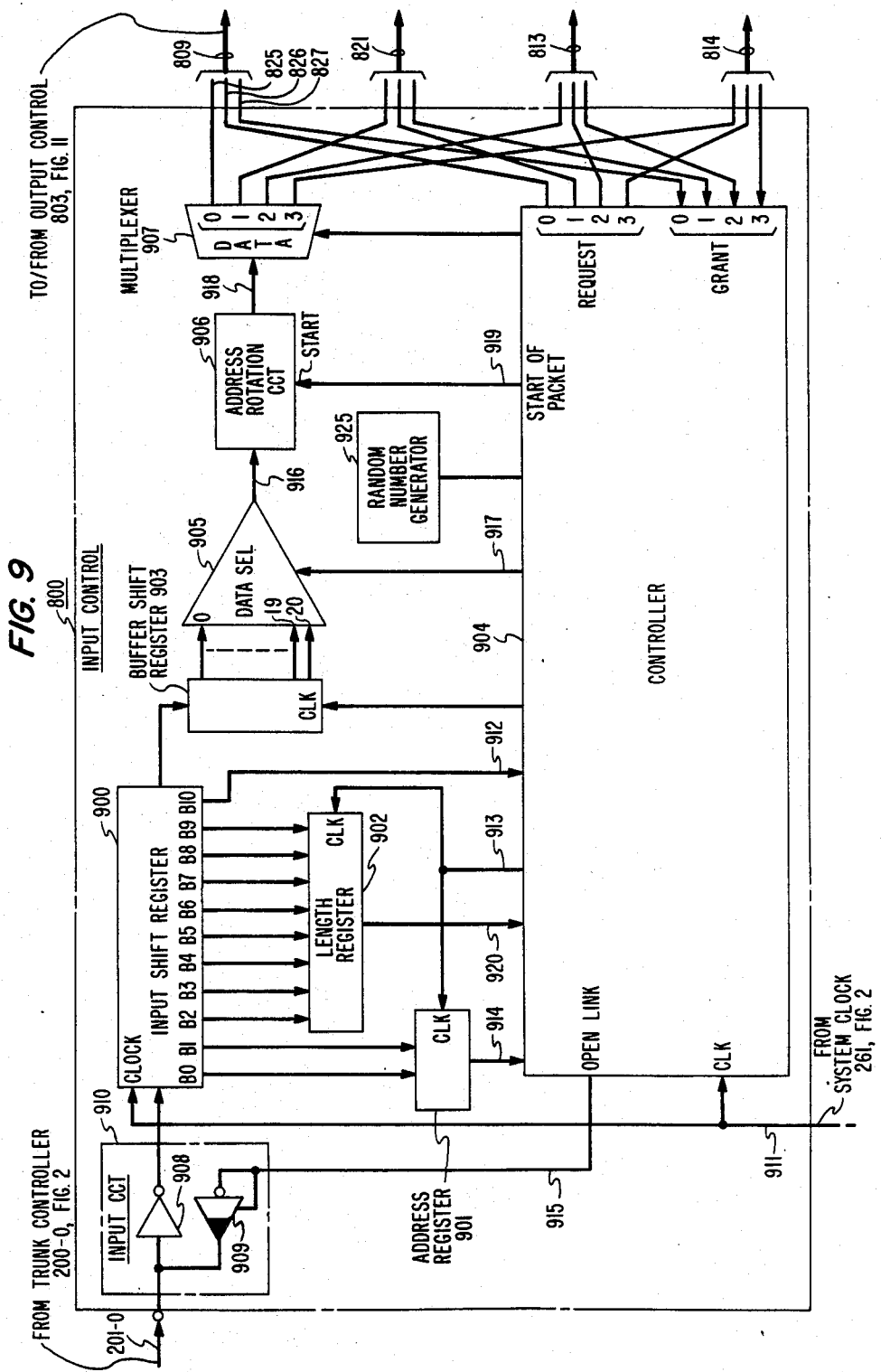
FIG. 9 illustrates input control 800 of FIG. 8.

Input control 800 of FIG. 8 is shown in greater detail in FIG. 9. Input circuit 910 receives information from link 201-0 and transmits to trunk controller 200-0 via link 201-0 the link open signal under control of controller 904. The function of the link open signal will be explained in a later section describing output control 803. Input shift register 900 is used to detect the start bit, which indicates the beginning of a packet. In addition, input shift register 900 is used to extract the network packet length field, which is saved in length register 902, and to extract the most significant bits of the destination trunk controller field or network address field, which is saved in address register 901. The buffer shift register 903 is capable of buffering one complete packet. Buffer shift register 903 provides an output after each 64 bits of storage. These outputs can be selected by data selector 905 under control of controller 904 to bypass unused portions of the buffer shift register 903. This bypassing is done when it is not necessary to buffer a whole packet before transmission of the packet can start to the output circuit and is done to speed up the transfer of a packet through input control 800. Address rotation circuit 906 performs the previously mentioned left rotate operation on the network address field before this address is transmitted with the remainder of the packet to the selected output control. Multiplexer 907 under control of controller 904 selects which of the cables 809, 821, 813 or 814 the data is to be transmitted on. Controller 904 makes this selection on the basis of the state of address register 901, random number generator 925, and the availability of links. Random number generator 925 is used to determine which of two address designated links is to be given preference for communicating a received packet.

The operation of input control 800 will now be further explained by using the previous example which dealt with the transmission of the packet shown in FIG. 3. Input shift register 900 is continuously being clocked by system clock 261 via conductor 911. As data is received via link 201-0, it is clocked through input shift register 900. Once the start bit reaches bit position 10 of input shift register 900, controller 904 detects this bit and transmits a pulse on conductor 913. This pulse causes length register 902 to store the network packet length field, and causes address register 901 to store the most significant bit of the destination trunk controller field, which is contained in input shift register 900.

Assuming that the output of generator 925 is a "0", controller 904 transmits a request via conductor 826 to output control 803 since the most significant address bit indicates that the packet is to be transmitted to either output control 803 or output control 807. While this request is being made, data is being shifted from input shift register 900 to buffer shift register 903 which has a number of output terminals. These output terminals are connected to different bit positions within buffer shift register 903. When controller 904 receives a grant signal from output control 803 via conductor 827, controller 904 calculates at which output of buffer shift register 903 the start bit of the packet is approaching within buffer shift register 903. This is done so that transmission of the packet to output control 803 can start as soon as possible. On the basis of this calculation, controller 904 controls data selector 905 to select the designated output of buffer shift register 903. The control information is transmitted to data selector 905 via cable 917. Data selector 905 transmits the data from the selected output to address rotation circuit 906 via conductor 916. Before transmitting data, controller 904 resets address rotation circuit 906 by transmitting the start of packet signal via conductor 919. Controller 904 then uses the packet length information stored in length register 902, which it reads via cable 920, to determine when the end of the packet has entered the input shift register. When this occurs and transmission has started from shift register 903, controller 904 transmits the link open signal via conductor 915. This signal is retransmitted via tri-state driver 909 and link 201-0 to trunk controller 200-0. The link open signal indicates that input control 800 is now ready to receive another packet. This function is explained in the section dealing with the output control circuit. If output control 803 was busy, input control 800 transmits a request to output control 807 via subcable 813, and transmission will commence through output control 807 if it is idle.

Figure 10:
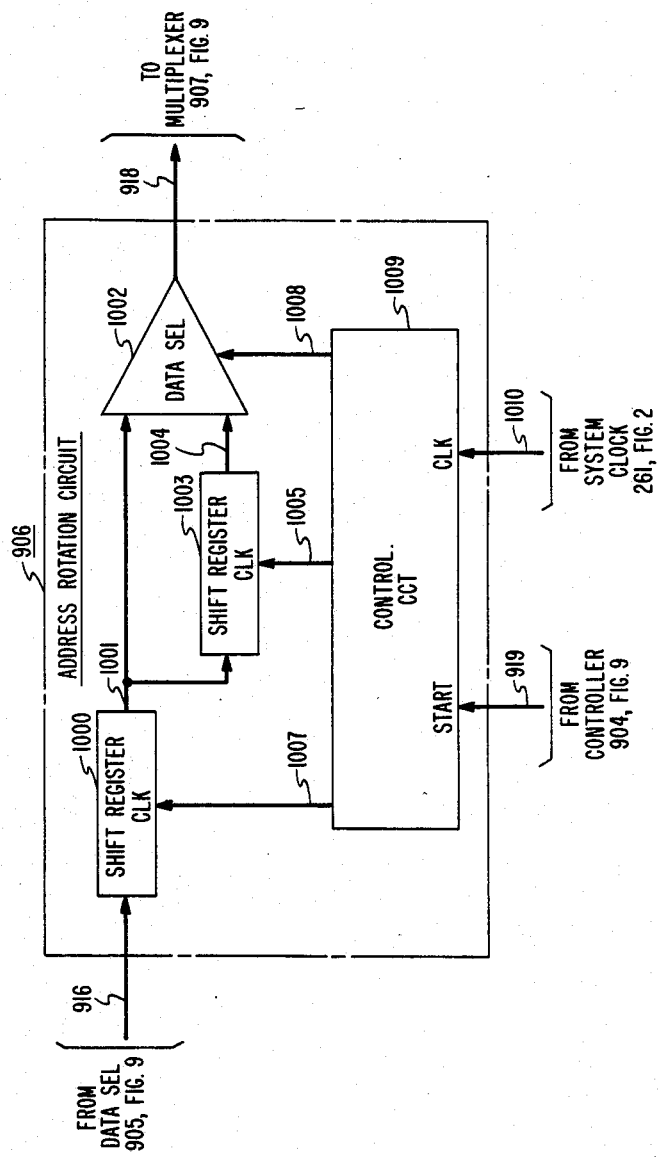
FIG. 10 illustrates address rotation circuit 906 of FIG. 9.

Address rotation circuit 906 is illustrated in greater detail in FIG. 10. The purpose of circuit 906 is to rotate the address field to the left one bit such that the most significant bit becomes the least significant bit. The rotation is necessary because each input control decodes only the most significant bit. Shift registers 1000 and 1003 are one bit registers, data selector 1002 is used to select either the output of register 1000 or register 1003, and control circuit 1009 controls the operation of the address rotation circuit. When control circuit 1009 receives the start of packet signal from controller 904 via conductor 919, it transmits a clock signal to register 1000 via conductor 1007, and to register 1003 via conductor 1005. This clock signal is derived from the signal received from system clock 261 via conductor 1010. Control circuit 1009 conditions data selector 1002 via conductor 1008 to select register 1003's output to be transmitted on conductor 918. Control circuit 1009 then counts the number of bits that are being transmitted via conductor 918; when the most significant bit of the network address field is contained within register 1003, control circuit 1009 ceases to transmit the clock signal to register 1003 via conductor 1005, and conditions data selector 1002 to select the output of register 1000. Control circuit 1009 then waits until the remaining bits of the network address field have been transmitted via conductor 918. At this point in time, control circuit 1009 commences to send clock signals to register 1003, and conditions data selector 1002 to select the output of register 1003. This operation results in the most significant bit of the network address field being rotated.

Figure 11:
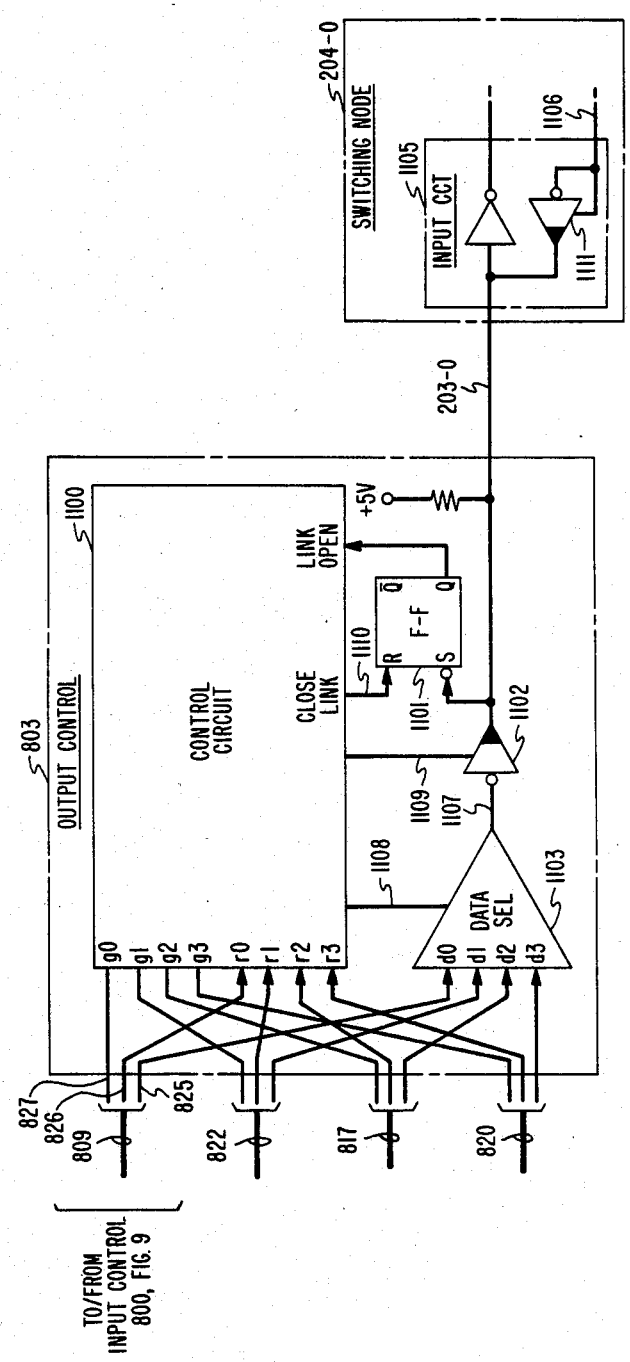
FIG. 11 illustrates output control 803 of FIG. 8.

Output control 803 is shown in greater detail in FIG. 11. Control circuit 1100 responds to requests from input controls 800, 802, 805, and 806, which are transmitted via cables 809, 822, 817, and 820. If flip-flop 1101 is set, control circuit 1100 responds to the request by transmitting a grant signal back to the requesting input control via one of the above mentioned cables. After acknowledging the request, control circuit 1100 conditions data selector 1103 to select the data conductor from the appropriate cable 809, 822, 817, or 820. Control circuit 1100 transmits the appropriate control information to data selector 1103 via cable 1108. Data selector 1103 transfers the data information received on the selected input terminal to conductor 1107. Tri-state device 1102 takes the information on conductor 1107 and transmits this data via link 203-0 to input circuit 1105, which is part of switching node 204-0. Control circuit 1100 controls the output of tri-state device 1102 via conductor 1109.

The operation of output control 803 as shown in FIG. 11 will be explained in greater detail by considering the previous example of input control 800 transmitting a packet of data to output control 803 via cable 809. When input control 800 transmits the request signal via conductor 826, control circuit 1100 transmits the grant signal to input control 800 via conductor 827 if link 203-0 is not being used by one of the other input control circuits and the output of flip-flop 1101 is set. Assuming that flip-flop 1101 was set, control circuit 1100 transmits the grant signal to input control 800 and conditions data selector 1103 via cable 1108 to select the data being transmitted on conductor 825 and retransmit this data on conductor 1107. In addition, control circuit 1100 enables the tri-state device 1102 to transfer the information on conductor 1107 to link 203-0.

It is to be understood that the above-described embodiment is merely illustrative of the principles of this invention; other arrangements may be devised by those skilled in the art without departing from the spirit and scope of the invention. In particular, one skilled in the art could foresee the use of a selection flip-flop in place of the random number generator utilized in FIG. 8.

What is claimed is:

1. A packet switching network for communicating packets each comprising routing information from network input ports to network output ports, said network comprising:
   a plurality of stages each comprising a plurality of switch nodes;
   inter-node and intra-node links connecting one of said switch nodes of one of said stages to a set of switch nodes in another stage;
   each of said intra-node links intra-connecting said one of said switch nodes to a switch node of said other stage via another switch node of said one of said stages and another inter-node link from said other switch node of said one of said stages to said switch node of said other one of said stages;
   said one of said switch nodes comprising means responsive the routing information of one of said packets for selecting a subset of said inter-node and intra-node links;
   means for generating signals to designate one of said subset of said inter-node and intra-node links for communication of said one of said packets; and
   means responsive to said signals for routing said one of said packets to one of said set of said switch nodes of said other one of said stages.

2. The system of claim 1 wherein said routing means comprises means for sending a packet communication request signal to the switch node of said one of said stages connected to the designated one of said intra-node links: and
   said connected switch node comprises means responsive to said packet communication request signal for supplying a signal to said one of said switch nodes of said stage to signify the packet communication availability of said connected switch node.

3. The system of claim 2 wherein said connected switch node interconnected via one of said inter-node links to another node in said other stage comprising buffer means for storing said one of said packets; and
   said supplying means comprises means for transmitting said packet communication availability signal upon said buffer means having present capacity to store said one of said packets.

4. The system of claim 3 wherein said supplying means further comprises means for transmitting a packet communication unavailability signal upon the absence of present capacity in said buffer means for storing said one of said packets; and said routing means further comprises means responsive to said packet communication unavailability signal for communicating said one of said packets to another one of said switch nodes connected to said subset of intra-node and inter-node links.

5. The system of claim 4 wherein said generating means comprises a random number generator to generate the designating signals.

6. A packet switching network for communicating packets each comprising address routing information from network input ports to network output ports, said network comprising:

a plurality of switching stages;

a plurality of inter-node links interconnecting said stages;

each of said stages comprising a plurality of switch nodes and intra-node links connecting subsets of said plurality of switch nodes;

one of said switch nodes of one of said subsets of one of said stages responsive to the address routing information of one of said packets for communicating said one of said packets to a switch node of another one of said stages via a second one of said switch nodes of said one of said subsets and one of said intra-node links; and one of said switch nodes of one of said stages responsive to address information of another one of said packets for communicating said other one of said packets to another switch node of said other one of said stages via one of said inter-node links.

7. The system of claim 6 wherein said one of said switch nodes of said one of said stages further comprises means responsive to said other one of said switch node of said other one of said stages being busy for communicating said other one of said packets to a third one of said switch nodes of said other one of said stages via a second one of said switch nodes of said one of said stages and said intra-node link.

8. The system of claim 7 wherein said switch node of said one of said stages further comprises means for buffering said other one of said packets for communication to said other one of said stages.

9. A packet switching network for communicating packets each comprising address routing information from network input ports to network output ports, said network comprising:

a plurality of switching stages;

a plurality of inter-node links interconnecting said stages;

each of said stages comprising pairs of switching nodes:

a plurality of sets of intra-node links each connecting an individual pair of said switching nodes;

one of said nodes of one of said pairs comprising means for controlling an input set of said inter-node links connected to a preceding stage;

means for controlling an output set of said inter-node links connected to a next sequential stage;

said input control means comprises means for controlling the set of intra-node links connected to the other one of said one of said pair;

said input control means further comprises means responsive to the address information of one of said packets for selecting one inter-node link of the output set of said inter-node links and one intra-node link of said set of intra-node links connected to said input control means:

said input control means further comprises means for generating a first set of signals designating intranode links and a second set of signals designating internode links; and said input control means further comprises first means responsive to said first set of signals and said selecting means for communicating one of said packets to the selected intra-node link of said intranode links and further comprises second means responsive to said second set of signals and said selecting means for communicating said packet to the selected inter-node link of said set of inter-node links.

10. The network of claim 9 wherein said designating means comprises a random number generator.

11. The network of claim 9 wherein said input control means further comprises means for transmitting a communication request in response to said selecting means and said second set of signals via said selected intranode link to another switch node of the next sequential stage connected to said selected inter-node link;

said other switch node comprises another input control means responsive to said communication request for generating a communication available signal upon said other input control means being idle;

the first communicating means comprises means responsive to said availability signal for enabling the communication of said packet.

12. The network of claim 11 wherein said other input control means comprises variable buffering means for variably storing packets and means responsive to present capacity of said variable buffering means to store said packet for enabling said communication availability signal.

13. The network of claim 9 wherein the second communicating means comprises:

means responsive to said first set of signals and said selecting means for transmitting a communication request signal via said selected intra-node link; and said output means comprises means responsive to said communication request for generating a communication availability signal upon said output means having capacity for transmitting said packet to said next sequential stage.

14. A method of switching packets through a packet switching network comprising a plurality of stages each having a plurality of switch nodes with inter-node and intra-node links connecting one of said nodes of one of said stages to a switch node in another stage and each of said intra-node links intra-connecting said one of said switch nodes to a switch node of said other stage via another switch node of said one of said stages and another inter-node link, and comprising the steps of selecting a subset of said inter-node and intra-links by said one of said switch nodes responding to routing information of one of said packets;

designating one of said subset of said internode and intra-node links for communication of said one of said packets; and routing said one of said packets to one of said set of said switch nodes of said other one of said stages via the designated link.

15. The method of claim 14 wherein said routing step further comprises the step of sending a packet communication request to the node of said one of said stages connected to the designated one of said intra-node links; and supplying a signal to said one of said switch nodes of said stage to signify the packet communication availability of the connected switch node.

16. The invention of claim 15 wherein said connected switch node having a buffering means for storing said one of said packets and said routing step further comprises the step of determining the present capacity of said buffer means to store said one of said packets prior to the transmission of said packet communication availability signal.

17. The invention of claim 16 wherein said determining step further comprises the steps of communicating a packet communication unavailability signal upon the absence of present capacity in said buffer means for storing said one of said packets; and communicating said one of said packets to another one of said switch nodes connected to said subset of intra-node and inter-node links in response to receipt of said packet communication unavailability signal.

18. The invention of claim 17 wherein said designating step comprises the step of randomly generating signals for use in the designation of the one of said links.

19. A packet switching network for communicating packets, each packet comprising routing information from network input ports to network output ports, said network comprising:

a plurality of stages each comprising a plurality of switch nodes;

inter-node links connecting one of said switch nodes of said stages to a set of switch nodes in another stage;

intra-node links interconnecting switch nodes of the same stage;

each of said intra-node links intra-connecting said one of said switch nodes of said one of said stages to a switch node of said other stage via another switch node of said one of said stages and another inter-node link from said other switch node of said one of said stages to said switch node of said other one of said stages;

said one of said switch nodes comprises:

output control means inter-connected by said inter-node links to said set of switch nodes in said other stage;

input control means responsive to said routing information of one of said packets for selecting a subset of said inter-node and intra-node links;

said input control means comprises:

controller means for generating signals to designate one of said subset of said inter-node and intra-node links for transmission of said one of said packets; and multiplexer means responsive to the generated signals for routing said one of said packets to one of said set of said switch nodes of said other one of said stages.

20. The system of claim 19 wherein said controller means comprises means for sending a packet communication request signal to said other switch node of said one of said stages connected to the designated one of said intra-node links; and said other switch node comprises another output control means responsive to said packet communication request signal for supplying a signal to said one of said switch nodes of said stage to signifying the packet communication availability of the connected switch node.

21. The system of claim 20 wherein said connected switch node interconnected via said one of said inter-node links to another node in said other stage and the latter node comprises buffer means for storing said one of said packets; and said other output control means transmits said packet communication availability signal upon said buffer means having present capacity to store said one of said packets.

22. The system of claim 21 wherein said other output control means further comprises means for transmitting a packet communication availability signal upon the absence of present capacity in said buffer means for storing said one of said packets; and said controller means further responsive to said packet communication unavailability signal for communicating said one of said packets to another one of said switch nodes connected to said subset of intra-node and inter-node links.

23. The system of claim 22 wherein said input control means comprises a random number generator to generate said designating signals.

24. A method of switching packets through a packet switching network comprising a plurality of stages each having a plurality of switch nodes with inter-node and intra-node links connecting one of said nodes of one of said stages to a switch node in another stage and each of said intra-node links intra-connecting said one of said switch nodes to a switch node of said other stage via another switch node of said one of said stages and another inter-node link, and comprises the steps of selecting a subset of said inter-node and intra-links by said one of said switch nodes responding to routing information of one of said packets;

designating one of said subset of said inter-node and intra-node links for communication of said one of said packets; and routing said one of said packets to one of said set of said switch nodes of said other one of said stages.

25. The method of claim 24 wherein said routing step further comprises the steps of sending a packet communication request to said node of said other one of said stages connected to said designated one of said intra-node links; and supplying a signal to said one of said switch nodes of said stage to signify the packet communication availability of the connected switch node.

26. The invention of claim 25 wherein said connected switch node having a buffering means for storing said one of said packets and said routing step further comprises the step of determining the present capacity of said buffer means to store said one of said packets prior to the transmission of said packet communication availability signal.

27. The invention of claim 26 wherein said determining step further comprises the steps of communicating a packet communication unavailability signal upon the absence of present capacity in said buffer means for storing said one of said packets; and communicating said one of said packets to another one of said switch nodes connected to said subset of intra-node and inter-node links in response to receipt of said packet communication unavailability signal.

28. The invention of claim 27 wherein said designating step comprises the step of randomly generating signals for use in the designation of said one of said subsets.

* * * * *

UNITED STATES PATENT AND TRADEMARK OFFICE
CERTIFICATE OF CORRECTION

PATENT NO. : 4,661,947
DATED : April 28, 1987
INVENTOR(S) : Chin-Tau A. Lea

It is certified that error appears in the above—identified patent and that said Letters Patent is hereby corrected as shown below:

Column 8, line 39, "responsive the routing" should read "responsive to the routing";

Column 10, lines 4 and 5, "in-tranode" should read --intra-node--;

Column 10, line 21, "intranode" should read --intra-node--;

Column 10, line 60, "internode" should read --inter-node--;

Column 12, line 15, "availability" should read --unavailability--.

Signed and Sealed this

First Day of September, 1992

Attest:

DOUGLAS B. COMER

Attesting Officer

Acting Commissioner of Patents and Trademarks